Patented Apr. 30, 1935

1,999,996

UNITED STATES PATENT OFFICE 1,999,996

PREPARATION OF BENZANTHRONYL SELENOETHERS

Melvin A. Perkins, Milwaukee, Wis., assignor to E. I. du Pont de Nemours & Company, Wilmington, Del., a corporation of Delaware No Drawing. Application December 20, 1933, Serial No. 703,251

5 Claims. (Cl. 260—61)

This invention relates to a new and improved process for preparing selenoethers of the benzanthrone series.

In U. S. Patent 1,924,456, a method for preparing benzanthronyl selenoethers is described, in which selenium and a Bz1-halogen-benzanthrone are heated together in a suitable solvent such as kerosene or tetrahydronaphthalene.

In my copending application Ser. No. 661,583, I have described a process for preparing symmetrical selenoethers which comprises reacting a Bz1-halogen-benzanthrone with alkali-metal selenides or alkali-metal polyselenides in alcoholic or aqueous alcoholic solution or suspension; while in my copending application Ser. No. 703,248, an improved process for the preparation of symmetrical or unsymmetrical benzanthronyl selenoethers is described, which comprises condensing a halogen-benzanthrone with a benzanthronyl selenide, selenol or diselenide.

I have now discovered that symmetrical benzanthronyl selenoethers may be produced by the deselenation of substituted or unsubstituted benzanthronyl selenols, selenoilates or diselenides by heating them in a suitable solvent with or without the addition of an acid binding agent or a selenium removing metal, such as copper. During this reaction, one atom of selenium is removed from the diselenides; alkali-metal selenide is removed in the case of the selenolates, and hydrogen selenide is removed when the selenols are used.

Any suitable solvent may be substituted for those hereinafter mentioned, so long as the reaction temperatures, in the neighborhood of 170° or above, may be attained.

While it is desirable to use acid binding agents such as sodium acetate, calcium hydroxide, sodium bisulfite, sodium carbonate, etc. when working with the selenols, they may be omitted in the deselenation of the diselenides or alkali-metal selenolates.

Without any intention of being limited thereby, the following specific examples are given to more fully illustrate the principles of this invention. The parts used are by weight.

Example 1

12 parts of Bz1,Bz1'-benzanthronyl diselenide (M. P. about 240° C.) and 2 parts of anhydrous sodium acetate are slurried in 120 parts of o-dichlorobenzene and the mixture heated to reflux for about 9 hours. At the end of this time, a test portion shows a bright, strong, green-blue coloration when dissolved in concentrated sulphuric acid.

Upon cooling and filtration, a nearly quantitative yield of Bz1, Bz1'-benzanthronyl selenide is obtained. (Recryst. from nitrobenzene—M. P. 336–7° C.)

Example 2

1 part of Bz1-benzanthrone-sodium selenolate is boiled in 6 parts of nitrobenzene for about 8 to 10 hours. Upon cooling, filtration and washing with alcohol and water, a yellow-brown solid is obtained. It gives an intense green-blue coloration in sulphuric acid and is identical with the product of Example 1.

Example 3

10 parts of Bz1,Bz1'-benzanthronyl diselenide are introduced into 100 parts of high boiling kerosene (point of initial reflux about 190° C.) and the mixture heated to 185–190° C. for several hours. At first the mass thickens rapidly, with the appearance of an orange solid, little change being noticeable thereafter. The initial solid which gives a dull, dark blue coloration in sulphuric acid is gradually displaced by a solid which gives intense bluish-green or greenish-blue colorations in sulphuric acid, and the end of the reaction may be estimated by this color test, heating being continued until no further change occurs. The Bz1,Bz1'-benzanthronyl selenoether produced may be isolated for example by filtering from the kerosene, steaming the cake and boiling with dilute sodium sulphide solution to remove free selenium and any unchanged diselenide, both of which dissolve in the sulphide solution and are filtered from the residual selenoether.

Example 4

10 parts of Bz2,Bz2'-dichloro-Bz1,Bz1'-benzanthronyl diselenide, prepared for example by air oxidation of an aqueous solution of the soluble reaction product of an alkali selenide and Bz1,-Bz2-dichloro-benzanthrone (M. P. 250–254° C.) are heated to 190–200° C. in 100 parts of high-boiling kerosene until no further change takes place. The coloration of the original solid, when dissolved in sulphuric acid, is violet-brown, while that of the reaction product is blue. The product may be isolated as in Example 3. It is further differentiated from the starting material in that it is not dissolved by sodium sulphide solutions, in that it contains but one atomic proportion of selenium and in that alcoholic potassium hydroxide fusion gives an intense blue melt of a dyestuff giving strong violet dyeings, apparently a chlorine-containing isoviolanthrone.

Example 5

If 6,6'-dibromo-Bz1,Bz1'-benzanthronyl-diselenide, prepared for example by aeration of the alkali-soluble reaction product of potassium selenide and 6,Bz1-dibromo-benzanthrone (M. P. 257° C.) is substituted for the starting material in Example 4, similar deselenation takes place. Since the sulphuric acid solutions of diselenide and selenoether are very similar (greenish-blue and bluish-green respectively) this cannot be used to test the end of the reaction, but instead, the boiling is continued until a sample of the solid is all, or nearly all, undissolved by warm sodium sulphide solution. The final product is apparently 6,6'-dibromo-Bz1,Bz1'-benzanthronyl selenide and gives, upon alcoholic caustic potash fusion, a blue melt of a dyestuff which dyes cotton very bluish-violet shades from a blue-violet vat.

Example 6

If Bz2,Bz2'-di(acetylamino)-Bz1,Bz1'-benzanthronyl diselenide, prepared by aeration of an aqueous solution of the soluble reaction product of potassium selenide and Bz1-chloro-Bz2-acetylamino-benzanthrone (M. P. 272-274° C.), is substituted for the starting material in Example 4 and the mixture boiled (185-190° C.) for ten hours, a brownish-yellow solid is obtained. It gives a brownish-red coloration in sulphuric acid (yellowish or greenish fluorescence), is insoluble in hot sodium sulphide solutions, and when fused in alcoholic caustic potash yields a bluish-green melt of a dyestuff which yields water-fast greenish-blue dyeings from a bright blue vat, and which is probably diamino-isoviolanthrone.

Example 7

10 parts of the diselenide, obtained by aeration of the soluble reaction product of potassium selenide and beta,Bz1-dichloro-benzanthrone (prepared by chlorination of the more soluble fraction of the beta-chloro-benzanthrone obtainable from beta-chloro-anthraquinone) and 100 parts of tetraline are heated to 200-205° C. for about 10 hours. The mass is then cooled and the solid filtered off and steamed to rid of solvent. To the solvent-free aqueous slurry sodium sulphide (30 parts of an 18% solution of Na₂S) is added, the mixture boiled for some time, filtered, and the solid washed and dried. The diselenide used as starting material gives a dark brownish-violet solution in sulphuric acid, an intense red-violet solution in sodium sulphide solution and an olive melt in alcoholic caustic potash, no real dye being formed. In contrast, the reaction product gives an intense dark blue solution in sulphuric acid, is not soluble in sodium sulphide solutions and gives in alcoholic caustic potash, a violet-blue melt of a dye-stuff which gives strong bluish-violet dyeings from a dark violet vat.

While in the specific examples above given only the use of the diselenides and alkali-metal selenolates has been disclosed, Bz1-benzanthronyl-selenol may also be used in place of the diselenides or selenolates. It is of course understood that either sodium or potassium selenolates may be converted to the selenoethers by this process.

By this process, substituted Bz1,Bz1'-benzanthronyl diselenides, Bz1-benzanthronyl selenols or selenolates may be converted to the selenoethers in the same manner as the unsubstituted compounds, for the use of reagents which might tend to split off the substituents are not necessary in this reaction.

In the following claims the terms "a Bz1,Bz1'-benzanthronyl diselenide", "a Bz1-benzanthronyl alkali-metal selenolate" or "a Bz1-benzanthronyl-selenol" are used to indicate these compounds as such or when they contain other monovalent substituents.

I claim:

1. In the preparation of Bz1,Bz1'-benzanthronyl-selenoethers the step which comprises heating to reaction temperatures a compound of the group consisting of a Bz1,Bz1'-benzanthronyl diselenide, a Bz1-benzanthronyl-alkali-metal selenolate and a Bz1-benzanthronyl selenol in a solvent.

2. In the preparation of Bz1,Bz1'-benzanthronyl-selenoethers the step which comprises heating a compound of the group consisting of a Bz1,Bz1'-benzanthronyl diselenide, a Bz1-benzanthronyl-alkali-metal selenolate and a Bz1-benzanthronyl selenol in a solvent at temperatures above 170° C.

3. In the preparation of Bz1,Bz1'-benzanthronyl-selenoethers the step which comprises heating a Bz1,Bz1'-benzanthronyl diselenide in a solvent at temperatures above 170° C.

4. In the preparation of Bz1,Bz1'-benzanthronyl-selenoethers the step which comprises heating a Bz1-benzanthronyl-alkali-metal selenolate in a solvent at temperatures above 170° C.

5. In the preparation of Bz1,Bz1'-benzanthronyl-selenoethers the step which comprises heating a Bz1-benzanthrone selenol in a solvent and in the presence of an acid binding agent at temperatures above 170° C.

MELVIN A. PERKINS.